Aug. 19, 1969 C. H. GRANT ET AL 3,462,324
EXPLOSIVE COMPOSITION COMPRISING A SALT COMPONENT
CONTIGUOUS TO AN OVER-FUELED SALT COMPONENT
Filed April 24, 1968 8 Sheets-Sheet 1

INVENTORS.
Charles H. Grant
Thomas E. Slykhou.
BY Bruce M. Kanne
ATTORNEY

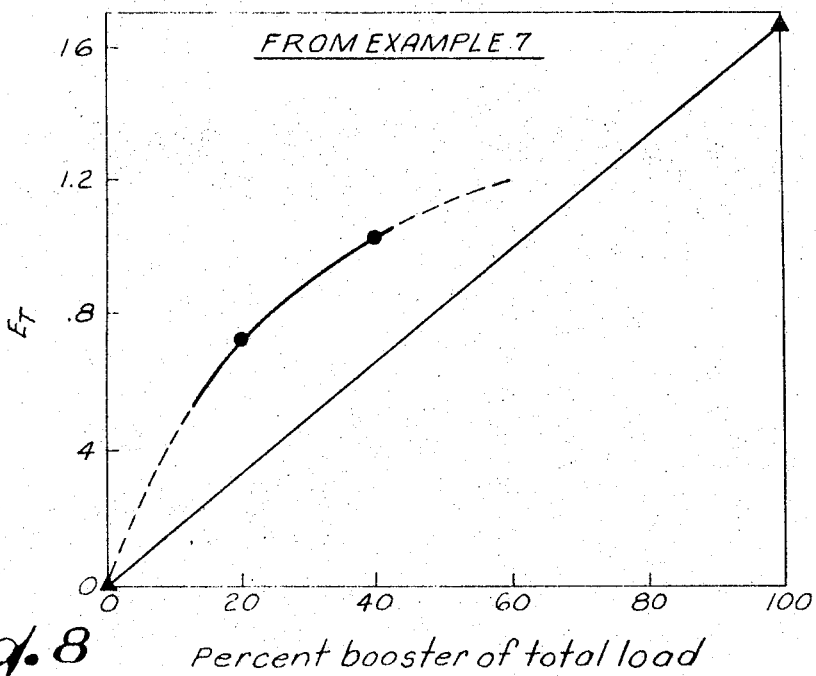
Fig. 8 — Percent booster of total load
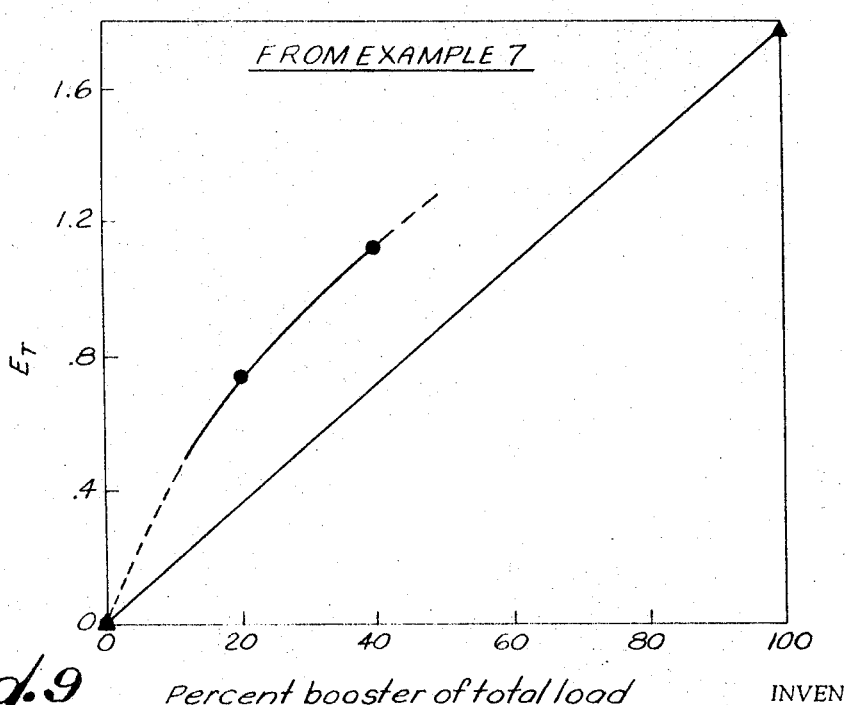
Fig. 9 — Percent booster of total load United States Patent Office 3,462,324
Patented Aug. 19, 1969

3,462,324
EXPLOSIVE COMPOSITION COMPRISING A SALT COMPONENT CONTIGUOUS TO AN OVER-FUELED SALT COMPONENT
Charles H. Grant and Thomas E. Slykhouse, Midland, Mich., assignors to The Dow Chemical Company, Midland, Mich., a corporation of Delaware
Continuation-in-part of application Ser. No. 671,616, Sept. 29, 1967. This application Apr. 24, 1968, Ser. No. 723,672
Int. Cl. C06b 1/04, 15/00
U.S. Cl. 149—2
25 Claims

ABSTRACT OF THE DISCLOSURE

A two component explosive composition system containing at least two distinct masses comprising: Component (1), an inorganic oxidizing salt mass contiguous to, Component (2), an over-fueled explosive mass, i.e., one having a paucity of oxygen as compared to the oxidizable fuel it contains; more particularly the invention pertains to a two component explosive system comprising an inorganic oxidizing salt mass adjacent to or surrounding an explosive composition mass comprising a mixture of an excess of a fuel with an inorganic oxidizing salt, and to methods for preparing the explosive and loading boreholes therewith.

CROSS-REFERENCE

Figure 1:
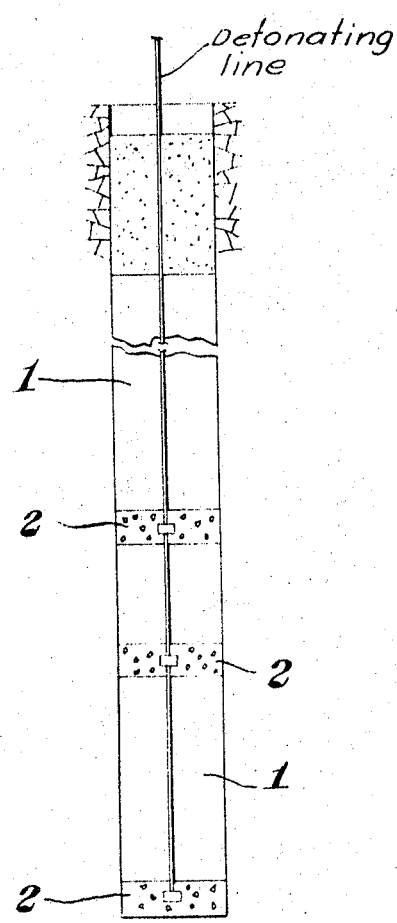

This application is a continuation-in-part of application Ser. No. 671,616, filed Sept. 29, 1967, now abandoned which in turn was a continuation-in-part of application Ser. No. 468,987 field July 1, 1965, now abandoned

BACKGROUND

Ammonium nitrate, alkali metal nitrates, alkaline earth metal nitrates and other inorganic oxidizing salts with or without petrolic liquids, can be used in explosive compositions. In recent years a mixture of about 94 percent by weight of ammonium nitrate with about 6 percent petroleum oil has been widely used commercially as a mining and excavating explosive. Inorganic chlorates and perchlorates have explosive properties, but they have not been widely accepted because of their sensitivity to detonation and cost. Both the chlorate, perchlorate and nitrate-fuel oil explosives have had the shortcoming of behaving very erratically in boreholes containing water and in their low power and total work in dry holes.

A more recent development in the field of explosives is the use of slurries of particulate inorganic oxidizing salt, e.g. ammonium nitrate, and an organic or inorganic fuel, or both, in a saturated solution of ammonium nitrate. These solutions can be aqueous or non-aqueous, such as ammonia solutions of ammonium nitrate, or solutions of the latter in water or aqueous ammonia. The sensitizers can be particulate light metals such as aluminum, alloys containing 20 percent or more aluminum, magnesium, alloys of magnesium containing 20 percent or more Mg, boron, vanadium, chromium, thorium, tungsten, titanium, mixtures of aluminum and ferrosilicon and other like metals. Other sensitizers include carbon or known water insoluble, solid nitro-organic explosives such as trinitrotoluene, cellulose nitrate, pentaerythritol tetranitrate, tetryl, RDX, DNT, composition B and pentolite. These slurries all have the advantage over ammonium nitrate-fuel oil mixtures in that they are not seriously affected by the presence of water in boreholes. Metallized slurries have the added advantage that they produce a considerably greater amount of total power as compared to the non-metallized slurries, if the amount of metal and the oxidizing agent are used in amounts not greater than about stoichiometric, i.e. substantially all of the fuel, e.g. metal, is completely oxidized to its highest oxidation state upon the explosion of the metallized slurry. If, however, more than stoichiometric amounts of metal are used in an explosive composition, the added metal does not tend to generate proportionately more power, because there is not sufficient oxygen to combine with the metal in an area that will contribute to useful explosive power.

SUMMARY

Now, unexpectedly we have found that if a mass comprising at least an inorganic oxidizing salt is placed contiguous to a mass comprising an over-fueled explosive, i.e. an explosive having a greater amount of fuel than stoichiometrically required for complete oxidation by said oxidizer in said explosive, the total power obtained on detonation of the two masses together is greater than the sum of the individual powers of each component when detonated separately.

An object of the invention is the provision of a two-component explosive system having two distinct masses which comprises; component (1), an inorganic oxidizing salt mass, contiguous to component (2), a mass comprising a mixture of at least one inorganic oxidizing salt and more than a stoichiometric amount of an oxidizable fuel, a portion of said fuel usually consisting of a solid particulate fuel, e.g. metals and carbon.

Another object is the provision of an explosive system comprising a first mass comprising an ammonium, alkali metal or alkaline earth metal nitrate, chlorate or perchlorate, wtih or without petrolic liquid, contiguous to a second mass comprising a slurry containing an inorganic oxidizing salt and an amount of solid particulate inorganic fuel greater than that stoichiometrically required for complete oxidation by the oxidizing ingredient in the slurry.

Another object is the provision of an explosive system comprising a first mass consisting of an inorganic oxidizing salt, which can be ammonium, alkali metal or alkaline earth metal chlorate, perchlorate or nitrate, with or without a petroleum fuel oil, contiguous to a second mass consisting of a slurry of said chlorate, perchlorate or nitrate in particulate form and a solid particulate inorganic oxidizable substance which can be carbon, metals such as aluminum, aluminum alloys containing at least 20 percent by weight of aluminum, magnesium, magnesium alloys containing at least 20 percent magnesium, alloys of aluminum and magnesium, vanadium, chromium, silicon, thorium, tungsten, boron, ferrophosphorous, ferrosilicon and mixtures and alloys thereof with or without carbon, and mixtures of aluminum and ferrosilicon in a saturated solution of said chlorate, perchlorate or nitrate.

Still another object is the provision of a two component explosive system comprising a first mass comprising a mixture of about 94 weight percent ammonium nitrate and 6 percent fuel oil contiguous to a second mass comprising an aqueous slurry of a particulate ammonium nitrate, sodium nitrate or a mixture of ammonium nitrate and sodium nitrate or sodium perchlorate and aluminum in suspension in a saturated solution of ammonium nitrate or a mixture of ammonium and sodium nitrate wherein the amount of aluminum in said slurry is at least 25 percent by weight of the slurry.

Another object is the provision of a method for preparing the explosive system comprising the oxidizing agent mass contiguous to the slurried mixture of oxidizing agent and excess fuel.

The term "contiguous to" as used in the description of this invention and in the claims is intended to mean that component (2) is adjacent to, abutting, surrounded by a substantial quantity of, in stratified contact with, or spaced a slight distance from component (1). Also, it is meant to include more than one mass of component (2) distributed in and/or spaced apart from a component (1) mass. The two components are usually confined in a borehole in the spatial relation defined herein. However, the components can be prepackaged as more fully described hereinafter.

The terms "slurry," "slurry composition," "slurry explosive" and the like, as employed herein designate those compositions which contain a distinct liquid phase and which are characterized as being flowable, pumpable, fluid-like in character, and which can be gelled or thickened by employing suitable gelling and thickening agents. They are meant to include those compositions which contain distinct solid and liquid phases and which have the indicated characteristics set forth previously.

"Dry," "dry compositions," "dry explosives" designate those compositions which normally do not contain distinct separate liquid and solid phases and are characterized as granular or pasty in form.

DRAWINGS

Figure 2:
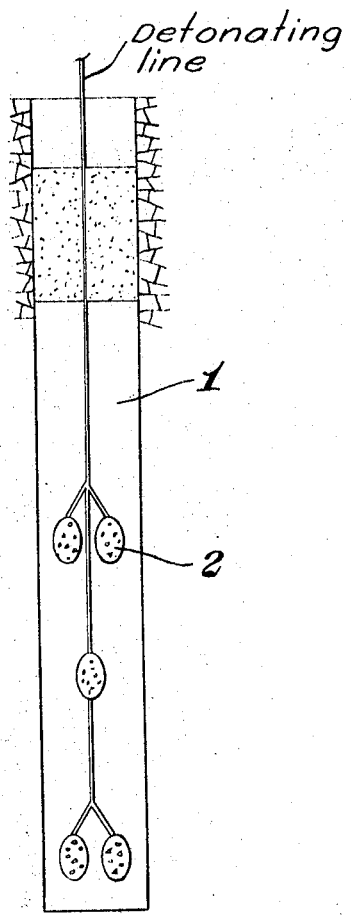

FIGURES 1 and 2 illustrate two means of loading a borehole with the two component explosive system as defined more fully hereinafter. It should be understood that these figures are only illustrative and other spatial relationships may be employed to most fully utilize the advantages offered by the novel two component system. For example, the positions, size, and number of over-fueled components can be varied depending on the particular characteristics of the formations in which the explosive is to be detonated. FIGURE 1 shows distinct masses of an over-fueled explosive 2 stratified with a mass containing at least one inorganic oxidizing salt 1. FIGURE 2 shows several distinct masses of an over-fueled explosive maintained in containers 2, e.g. plastic bags, and surrounded by a substantial quantity of a mass 1 containing at least one inorganic oxidizing salt.

Figure 3:
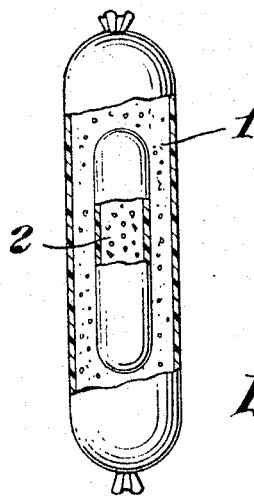

FIGURE 3 illustrates one embodiment of a packaged explosive containing the two component explosive system as defined hereinafter. The packaged explosive consists of an inner container, e.g. plastic bag, containing an over-fueled explosive 2 surrounded by an inorganic oxidizing salt mass 1 which in turn is sealed in a second container. One or more of the packaged systems can be placed in a borehole and detonated with suitable initiators. Again, more than one over-fueled explosive mass may be positioned in an organic oxidizing salt mass and prepackaged in a manner similar to that illustrated in FIGURE 3.

FIGURES 4 through 14 represent graphic comparisons of some two component explosive systems actually tested and described in detail in the examples. The straight line in each graph represents a line drawn between two control shots. One control shot consisted of the detonation of a fixed quantity of a base charge, hereinafter referred to as component (1), with a conventional high pressure explosive initiator, e.g. pentolite initiator, and the total energy observed upon detonation as determined by a standard underwater test is illustrated on the vertical coordinate. The other control shot consisted of the detonation of a like quantity of an over-fueled explosive composition, hereinafter referred to as component (2), and the total energy of detonation for that blast. The straight line between the two control shots represents the theoretical or expected total energy of the detonation (which is normally considered additive) of an explosive wherein a certain weight of a base charge, component (1), is replaced with an equal weight of an overfueled explosive, component (2). The actual total energy observed upon detonation of two component systems employing various combinations of component (1) and component (2) are plotted. In each instance, as the figures illustrate, the total energies observed upon detonation of certain two component systems was greater than that theoretically expected by an addition of the separate energies as denoted by the straight line. The actual composition of the various components is described in detail in the examples.

Figure 15:
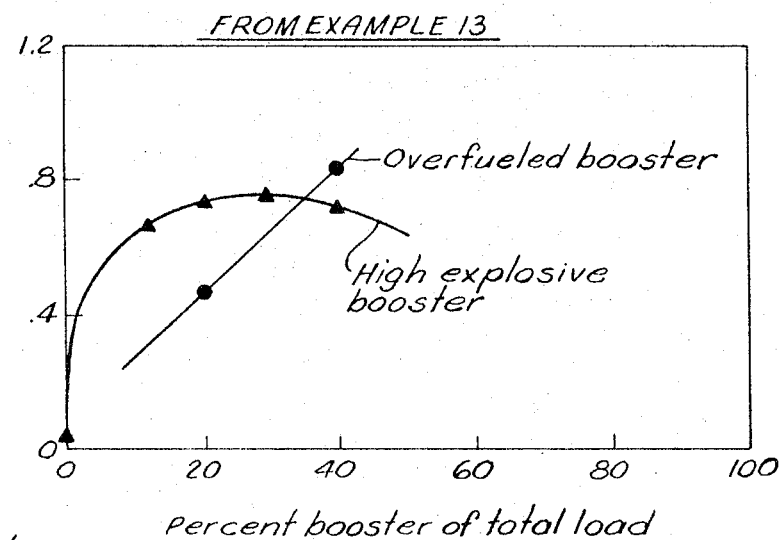
Figure 16:
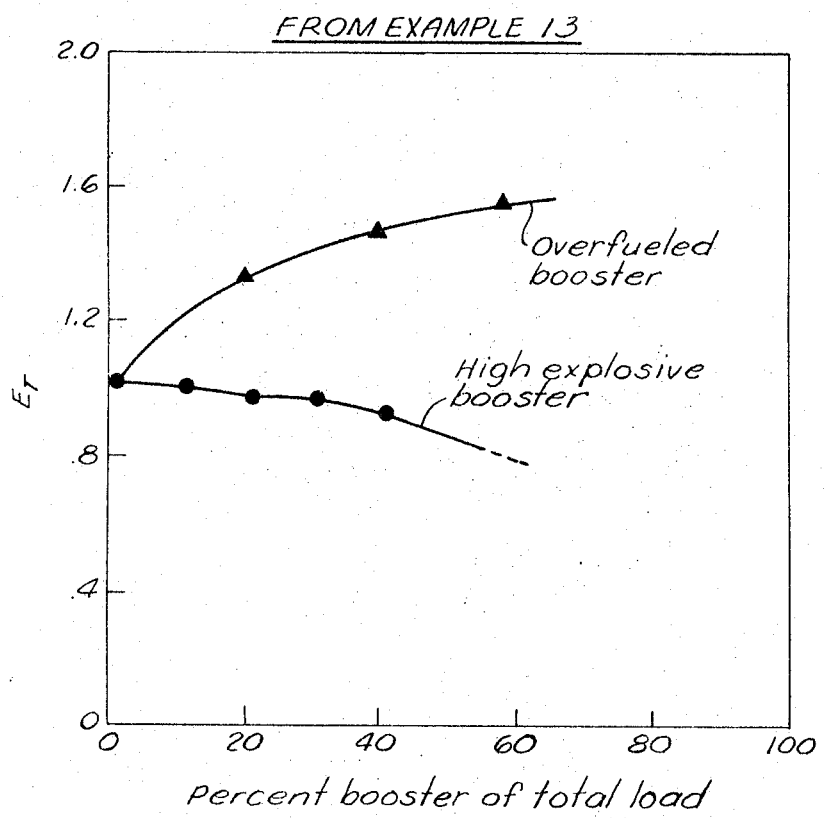

FIGURES 15 and 16 illustrate a comparison of the total energies observed in one series of underwater detonation tests employing a base charge, component (1), and various quantities of a conventional high explosive booster, and a second series of tests employing the same base charge and various quantities of an over-fueled explosive booster, component (2), as defined more fully hereinafter. In both instances, the total energy of detonation was observed to increase with increased amounts of the over-fuel component (2) booster whereas the total energy of detonation decreased with a like increase of a conventional high explosive booster.

PREFERRED EMBODIMENT

The above objects are attained by either stratifying a component (1), an inorganic oxidizing salt mass, with at least one component (2), a second mass consisting of an explosive containing more than the stoichiometric amount of a fuel, an oxidizable material, based on its oxidizing ingredient or by spacing the over-fueled component (2), so that the oxidizing agent component (1) surrounds the over-fueled component (2). The over-fueled component can range from about 0.4 to about 60 percent or more by weight of the total explosive load [component (1) and component (2)], depending on the amount of oxidizable material in component (2) and the composition of component (1). With increased amounts of oxidizable material in component (2), the lower ranges in the percentage scale can be used, or preferably, if aluminum powder is one of the fuel ingredients of an over-fueled composition, component (2), the latter is usually used in an amount to provide from about 0.75 to 18 percent by weight of aluminum based on the total weight of components (1) and (2). More preferably, the aluminum content ranges from about 0.9 to about 8 percent by weight of components (1) and (2), and most preferably from about 0.9 to about 10 percent Al.

In effect, the final explosive is a two-component explosive system usually confined in a borehole, or prepackaged, as illustrated by FIGURES 1, 2 and 3, containing a first mass, component (1), the oxidizing salts, contiguous to a second mass, component (2), an over-fueled explosive composition consisting of oxidizable materials and oxidizing agents enumerated below. A portion of the oxidizable material usually consists of a solid oxidizable material, e.g. metal, carbon and the like.

Component (1) can be a slurry or dry composition. For example, component (1) can be one or a combination of the following inorganic oxidizing salts: ammonium nitrate, sodium nitrate, potassium nitrate, caesium nitrate, lithium nitrate, rubidium nitrate, any alkaline earth nitrate, ammonium chlorate, alkali metal chlorates, alkaline earth chlorates, ammonium perchlorate, alkali metal perchlorates and alkaline earth metal perchlorates, and ammonium salts or complexes of the above compounds.

Other ingredients which can be added to component (1) are solvents or carriers for said inorganic oxidizing salts, and/or liquid fuels and sensitizers such as petrolic liquids including, for example, crude oil and liquid hydrocarbons derived or fractioned therefrom, and kerosene, diesel fuel, petroleum distillate, unrefined petroleum components, water, liquid organic fluid extenders such as monohydroxy alkanols, ethylene glycol, propylene glycol, glycerol, formamide, dimethyl sulfoxide, methanol, hexamethylenediamine dinitrate, hexamethylenetetramine mononitrate, mixtures of these various constituents and other like materials. The amount of petrolic liquid usually ranges up to about 10 percent by weight of component (1). When component (1) consists of ammonium nitrate and a fuel oil the composition is commonly referred to in the art as ANFO.

If water and/or other liquid constituents and mixtures thereof, such as a petrolic liquid, are used in component (1), the mixture of component (1) can be gelled is desired. This can be accomplished by blending a small amount of a natural gum or a high molecular weight addition polymer of an $\alpha,\beta$-monoolefinically unsaturated carboxylic or sulfonic acid, such as acrylic acid and styrene sulfonic acid, or an amide such as acrylamide, or a copolymer maleic anhydride and another monomer copolymerizable therewith, and a small amount of aqueous ammonia or a monovalent alkali to dissolve or swell the polymer to a gel state, with the oxidizing agent or oxidizing agent plus the liquid. The gel can thus be aqueous or non-aqueous.

Examples of other suitable sensitizers and fuels which can be employed in either dry or slurry compositions of component (1) include high explosives such as TNT, smokeless powder, PETN, RDX, DNT, pentolite and other organic nitrates, nitro compound and nitroamine high explosives; metallic sensitizers such as, for example, particulate light metals, particulate aluminum, magnesium, silicon, iron, ferrosilicon, ferrophosphorous, titanium, magnesium-aluminum alloys and the like; and carbonaceous materials, such as finely divided carbon, corn starch, sugar, petrolic liquids such as crude oil and liquid hydrocarbons derived therefrom, formamide, glycols, urea, alcohols and the like. Carbonaceous materials are usually employed in an amount up to about 20 percent by weight of the compositions. Metallic sensitizers and fuels usually range in size from about 4 mesh to about 200 mesh. Various combinations of sensitizers can also be employed such as, for example, metallic fuels and fuel oils are commonly used together and high explosives such as, for example, smokeless powder and metallic fuels are employed in the same explosive composition. In practicing the present invention, however, the fuels are usually employed in amounts less than stoichiometrically required to utilize all the oxidizing constituents of component (1).

As has been indicated hereinbefore, component (1) can be a slurry composition; any of the well known slurry explosive compositions known in the art which contain inorganic oxidizing salts as the major ingredients can be employed. These slurry compositions usually contain as essential constituents, (a) at least one inorganic oxidizing sale, (b) a fuel and/or sensitizer, and (c) water. A gelling or thickening agent is also usually employed to impart stability and water resistance to the slurries.

Examples of inorganic oxidizing salts usually employed in such slurries include ammonium, alkali metal and alkaline earth metal nitrates, perchlorates, and chlorates. Specific examples of commonly employed salts are ammonium nitrate, ammonium perchlorate, sodium nitrate, sodium perchlorate, potassium nitrate, potassium perchlorate, magnesium perchlorate, calcium nitrate, and other like salts and mixtures thereof. Usually the slurry compositions contain from about 10 percent to about 90 percent by weight of the inorganic salts. Preferably at least one of the inorganic oxidizing salts is ammonium nitrate.

An example of a non-metallized slurry explosive which may be employed as component (1) contains the following constituents: ammonium nitrate from about 60 to 70 percent, sodium nitrate up to about 10 percent, water up to about 8 percent, formamide about 8–12 percent, a glycol from 1 to about 10 percent, sugar or other carbonaceous fuels up to about 6 percent and also may include a gelling and/or thickening agent. A specific composition consists of about 69 percent ammonium nitrate, about 8 percent sodium nitrate, 7 percent water, 10 percent formamide, 1 percent propylene glycol, 4 percent sugar and about 1 percent of guar gum.

As indicated hereinbefore, component (1) may consist of a single particulate inorganic oxidizing salt such as, for example, ammonium nitrate or mixtures of two or more inorganic oxidizing salts. Also, an inorganic oxidizing salt with a solvent and/or carrier usually containing a dissolved inorganic oxidizing salt may be employed as component (1). A mixture containing from about 70 to 100 percent by weight of ammonium nitrate and up to 30 percent water can be used. A specific composition containing about 80 percent ammonium nitrate and 20 percent water has been employed. Also a mixture containing about 90 percent ammonium nitrate and 10 percent of an aqueous ammoniacal solution saturated with ammonium nitrate, e.g. Diver's fluid, can also be employed. Other constituents may also be employed in the ammonium nitrate solutions such as, for example, up to about 15 percent of a water miscible organic fluid extender and fuel such as formamide, glycols such as propylene and ethylene glycol, alcohols, and the like. Also, the solvent bearing component (1) can contain a thickening or gelling agent such as those described hereinbefore.

Of the component (1), a composition of 94 percent by weight of fertilizer grade ammonium nitrate and about 6 percent fuel oil is preferred. This composition is referred to as ANFO in the explosives art.

Thus, it is apparent that component (1) can consist of very insensitive compositions and/or compositions which are in themselves explosives.

Component (2) of the explosive system can be any of the oxidizing salts as mentioned as being operable in component (1) or mixture thereof, together with an amount of an oxidizable material, usually a portion of which consists of a solid oxidizable material, greater than that calculated as being completely oxidizable to its highest oxidation state by the oxygen available in the oxidizing agent in component (2). Component (2) is usually an explosive composition, meaning it is usually sufficiently sensitive to be detonated with a blasting cap and/or high pressure booster.

The oxidizable material in component (2) can be finely divided carbon or a particulate metal or metalloid such as light metal. Examples of specific metals include aluminum, alloys thereof containing at least 20 percent aluminum, alloys of magnesium containing at least 20 percent Mg, such as the ASTM designated ZK10, ZK60, HK31 and AZ31 alloys, boron, vanadium, chromium, thorium, titanium, tungsten, ferrophosphorous, iron, ferrosilicon and mixtures and alloys of these oxidizable ingredients and other like metals and alloys thereof.

The amount of oxidizable material in component (2) usually ranges from about 18 to 80 percent by weight of this component. When aluminum or magnesium metal is used as the oxidizable material, the preferred range is from about 25 to about 70 percent by weight of the final mixture. The amount of oxidizable material usually ranges from 20 to about 60 percent by weight of the final mixture of component (2), but it should be more than that calculated to be completely oxidized to its highest oxidation state by the oxidizing ingredient in component (2) and will vary somewhat depending on the amount and type of optional ingredients in the mixture.

Optional ingredients which may be employed in component (2) consist of those solvents, fuels and sensitizers as described hereinbefore for component (1), and, for example, may contain up to about 25 percent by weight of water, up to about 33 percent by weight of formamide, glycols such as propylene glycol, alcohols and other fluid extenders and up to about 6 percent of a water-swellable polymeric substance, either as a natural gum or a synthetic polymer. Also, component (2) may contain up to about 10 percent of petrolic liquid such as those described hereinbefore.

Thus, component (2) can be a dry mix or it can be a slurry of oxidizable material and oxidizing agent or a gel of the latter ingredients.

Component (2) can also be an aqueous or a non-aqueous slurry. Thus, if ammonium nitrate or a mixture of ammonium nitrate and an alkali metal nitrate, such as sodium nitrate, is used as the oxidizing agent, the nitrates can be dissolved in a minimum of water, ammonia ($NH_3$) or aqueous ammonia. The ammoniacal ammonium nitrate solutions are represented by Diver's liquid, a saturated solution of ammonium nitrate in substantially anhydrous ammonia or the commercially available Spensol brand water containing ammoniacal ammonium nitrate solutions, such as, for example, Spensol D having a nominal composition on a weight basis of about 64 percent ammonium nitrate, 6 percent water and 30 percent ammonia. When a slurry is formed, it is desirable but not essential, to have some of the oxidizing agent together with the oxidizable material suspended in a saturated solution of the oxidizing agent.

For a component (2), one preferred composition is a slurry composition having the following constituents as percentages by weight:

| | Percent |
|---|---|
| Water | 10-15 |
| Formamide | 5-10 |
| Sodium nitrate | ¹10-25 |
| Ammonium nitrate | ¹10-50 |
| Aluminum | 25-50 |
| Gum | 0-1 |

¹ Total nitrate 35-60%.

The particle size of the particulate metal fuel, such as aluminum, in this preferred composition, can range from minus 325 Tyler Mesh to about plus 24 mesh. The preferred particle size of the aluminum is that which passes a 40 mesh Tyler Sieve and is about 99 percent retained on a 200 mesh sieve.

If desired, component (2) can contain from about 5 to about 25 percent, based on the weight of the other ingredients, of other sensitizers and/or fuels such as those previously indicated hereinbefore as suitable for use in component (1). These optional sensitizers and/or fuels can be present in either a dry mix or in a paste or slurry composition comprising component (2). However, component (2) must be over-fueled with respect to the principal oxidizable material, i.e., the fuel component such as metal or carbon.

A preferred dry component (2) explosive is one which contains from about 30 to 80 percent of prilled ammonium nitrate, 1 to 10 percent of a petrolic liquid and 18 to 60 percent of a particulate metal. This composition, even though it may contain some petrolic liquid is still particulate in nature and granular in appearance, i.e. is not a slurry.

There are several ways of loading a borehole with the two component explosive system.

In one system, FIGURE 1, alternate decks of explosive and oxidizing material can be used. The over-fueled explosive component (2) is placed in one or more of the lower decks, and is then covered with an oxidizing ingredient, component (1), such as a mixture of 94 percent ammonium nitrate and 6 percent fuel oil.

In a second system, an over-fueled explosive, component (2), contained in plastic bags is spaced in alternating layers with a component (1), such as an ammonium nitrate-fuel oil mixture, FIGURE 2.

In a third system, a metallized slurry, of which a slurry of 10-15 percent water, 8-10 percent formamide, 25 percent or more particulate aluminum of 40-100 mesh and the remainder ammonium nitrate or a mixture of ammonium nitrate and sodium nitrate is a representative, is placed at a predetermined position along the length of a borehole and in the bottom of a borehole as component (2) and then the hole is filled with ammonium nitrate (94 percent), fuel oil mixture (6 percent), component (1), in which bags of the slurry above described are suspended or positioned. The slurry in the system can be one in which a saturated solution of ammonium nitrate contains suspended therein some particulate ammonium nitrate and a solid nitro-organic explosive, such as TNT, cellulose nitrate or other well known nitro-organic compounds which can be detonated with high pressure boosters.

There are many other variations of arranging the two components of this explosive system. It is essential only that one of the components be over-fueled with respect to oxidizable fuel and the other be an oxidizing salt mass as described as component (1) above and that the latter be contiguous to this over-fueled mix. For example, the two-component system can be prepackaged in suitable containers and loaded into a borehole to provide the two-component system. As illustrated in FIGURE 3, the two-component system may be packaged in a substantially cylindrical package in which an inorganic oxidizing salt mass, component (1), designated as 1 in the figure, completely surrounds a second mass consisting of the over-fueled component (2), designated as 2 in the figure. The packaging material can consist of any sufficiently strong material which will retain the two-components in a distinct mass from each other. Plastic materials are especially useful when the explosive system is to be employed in water-filled boreholes and the like.

For detonating the explosive, an initiator, such as high pressure booster armed with an electric blasting cap is employed. Preferably, the cap should be a No. 8 or larger and more desirably it is an Engineer Special Blasting Cap equivalent to about a No. 10 electric blasting cap. The booster can be RDX, Pentolite, pressed tetryl, shaped charges such as GG2 or GG4, or other well known high pressure boosters. The amount of booster needed will depend in part on the type used and in part on the size of the load in the borehole. The electric cap is connected to a wire, which in turn is connected to a controllable source of electric current, which can be fed through the wires to the cap at the desired time. It is usually preferred that at least one initiator be employed in or adjacent to the component (2).

The following examples are intended to be illustrative and not limitations of the invention. The proportions are given in parts or percentages by weight unless otherwise indicated.

Example 1

In this test in a coal field being strip mined, 20 holes averaging about 48 feet deep and 12¼ inches in diameter were back filled with about 4 feet of dirt. The holes were drilled in three rows of 6, 7, and 8 each and were spaced apart 37 feet in each row (spacing) and 33 feet between rows (burden). Into each hole 120 pounds of 94 perecent $NH_4NO_3$–6 percent fuel oil were added. Then 25 lbs. of an over-fueled mixture, containing about 10 percent formamide, about 12 percent water, 30 percent aluminum powder of 40-100 mesh, the remainder ammonium nitrate, was placed in the hole and armed with a 1 pound high density primer (a pressed mixture hereinafter referred to as HDP primer) connected to Primacord; 120 lbs. of 94 percent $NH_4NO_3$–6 percent fuel oil was poured over the top of the aluminized slurry. Three hundred sixty pounds of the $NH_4NO_3$-fuel oil mixture defind above, in bags, were placed on top of the slurry. Then 25 additional pounds of the aluminized slurry, described above, also armed with a 1 pound HDP primer connected to Primacord was added and over this was poured 120 lbs. of the 94 percent $NH_4NO_3$–6 percent oil mixture. Loading was completed with 120 lbs. of 94 percent $NH_4NO_3$–6 percent fuel oil mixture contained in bags and then covered with 26 feet of stemming.

The holes were detonated in series of 4 holes in each of the first two shots; three holes in each of the next four shots.

The results of these shots were excellent. The burden covering the coal was broken well for relatively easy mechanical handling and the entire bank of covering was moved from the coal vein, so that no secondary blasting was needed. The powder factor was calculated to be 2.432 cu. yds. per lb. of explosive.

In commercial practice in this mine, using only 94 percent $NH_4NO_3$–6 percent fuel oil as the explosive, in comparable sized holes, fired in comparable sequences, a maximum hole spacing was 30 x 34 ft. The estimated powder factor was 2.007 cu. yds. per lb. of powder.

In a second series of tests in the same coal field, using a single continuous deck of explosives having an overfueled explosive interposed between an oxidizing agent, 21 holes approximately 45 feet deep and 12¼ inches in diameter were drilled in three rows, 7 to a row, with a spacing of 40 feet between holes in a single row and 34 feet between rows. The bottom of each hole was back filled about 4 ft. In the bottom of each hole were placed 120 lbs. of ANFO (94 percent ammonium nitrate-6 percent fuel oil), then 25 lbs. of the aluminized ammonium nitrate slurry described above, and 120 lbs. of loose ANFO were packed around the aluminized slurry. An additional 340 lbs. of ANFO was added in bags, another 25 lbs. of aluminized slurry, covered by 120 lbs. of loose ANFO and 120 lbs. of ANFO in bags on the top of the explosive column. Each 25 lbs. of aluminized slurry was armed with a 1 lb. HDP booster which was connected to 70 ft. of Primacord. The charges were detonated through electrical means. The amount of overburden blasted from the top of the coal vein averaged about 2256.6 cubic yds. per hole. This represents a powder factor of about 2.582 cu. yds. per lb. of explosive.

Tabulated below are the pertinent data on the charge size in each hole.

TABLE I

| Hole No. | Depth in ft. | Stem in ft. | ANFO, lbs. | Aluminized slurry, lbs. |
|---|---|---|---|---|
| 1 | 43 | 23 | 780 | 50 |
| 2 | 45 | 24 | 840 | 50 |
| 3 | 46 | 24.5 | 840 | 50 |
| 4 | 46 | 24.5 | 840 | 50 |
| 5 | 46 | 24.5 | 840 | 50 |
| 6 | 45.5 | 24 | 840 | 50 |
| 7 | 45 | 23.5 | 840 | 50 |
| 8 | 44 | 22.5 | 780 | 50 |
| 9 | 42.5 | 23 | 720 | 50 |
| 10 | 43 | 24.5 | 780 | 50 |
| 11 | 46 | 24 | 840 | 50 |
| 12 | 45 | 23.75 | 840 | 50 |
| 13 | 44.5 | 23.75 | 840 | 50 |
| 14 | 44.5 | 24 | 840 | 50 |
| 15 | 46 | 24 | 840 | 50 |
| 16 | 45 | 24.5 | 840 | 50 |
| 17 | 46 | 24.5 | 840 | 50 |
| 18 | 46 | 24.5 | 840 | 50 |
| 19 | 42 | 22 | 720 | 50 |
| 20 | 45 | 24 | 840 | 50 |
| 21 | 45 | 24 | 840 | 50 |

In each of the holes of this example, there was only one continuous column of explosive containing an overfueled slurry of aluminum and ammonium nitrate suspended in a saturated ammonium nitrate solution stratified between ammonium nitrate fuel oil mixture at various levels in the explosive column.

The data show that a fairly wide variation in proportions of aluminized slurry to ANFO can be employed in the practice of this invention.

Example 2

In this series of tests, two rows of holes, each row containing nine holes varying in depth from 55 to 63 feet, and having a diameter of 10⅝ inches and a spacing of 26 x 30 feet were filled with 2 and 3 deck charges of explosive. To the six front holes farthest to the right and three holes farthest to the right in the back row were added 50 lbs. of slurry of 10 percent formamide, 12 percent water, 30 percent aluminum powder 40–100 mesh, 1 percent gum, 10 percent $NaNO_3$ and the remainder $NH_4NO_3$, and 300 lbs. of 94 percent $NH_4NO_3$–6 percent fuel oil, which surrounded the aluminized slurry. Two 1 lb. pentolite boosters were placed in the slurry. The boosters were connected with Primacord to an electrical detonating unit. Over this deck was placed 15 ft. of stemming. Then 200 lbs. of ANFO charged with 1 lb. of pentolite was placed in the hole and 20 ft. of stemming added.

To the remaining holes were added 25 lbs. of the aluminized slurry described above and 300 lbs. of ANFO armed with a 1 lb. pentolite booster. This deck was covered with 10 ft. of stemming. The next deck contained 150 lbs. ANFO, 25 lbs. of the aluminized slurry and 1 lb. of pentolite. This intermediate deck was covered with 10 ft. of stemming. The upper deck consisted of 100 lbs. ANFO charged with 1 lb. of pentolite. Over this upper deck were 24 ft. of stemming. All pentolite boosters were connected to Primacord.

On detonating these holes, the overburden was blasted into the pit in a size which was amenable to mechanical handling. It is calculated that the average powder factor is 2.86 cu. yds. per lb. of explosive.

The normal spacing in this mine with 94 percent $NH_4NO_3$–6 percent fuel oil, using the same size boreholes, the same weight of ANFO as in the experimental shots, the same types of booster, and the same type of loading procedure, was 22.5 x 26 ft. The calculated powder factor is 2.34 cu. yds. per lb. of explosive.

Example 3

In these tests, two rows of 10⅝ inches diameter holes having depths ranging from 57.5 to 61 ft. were drilled in overburden covering a coal vein. The front row had seven and the back row had 8 holes in staggered relation, with a spacing of 30 ft. for each hole in a single row and 26 ft. between rows, as shown by the following pattern:

```
1   2   3   6   10   11   12   13
  4   5   7   8   9   14   15
```

Pertinent data on these holes are tabulated below:

TABLE II

| Hole No. | Depth, ft. | ANFO, lbs. | Pentolite, lbs. | Primacord, ft. | Slurry, lbs. |
|---|---|---|---|---|---|
| 1 | 57.5 | 630 | 4 | 60 | 50 |
| 2 | 57.5 | 600 | 4 | 60 | 50 |
| 3 | 58.5 | 600 | 4 | 60 | 50 |
| 4 | 57.5 | 630 | 4 | 60 | 50 |
| 5 | 58 | 630 | 4 | 60 | 50 |
| 6 | 59 | 600 | 3 | 60 | 25 |
| 7 | 58 | 650 | 3 | 60 | 25 |
| 8 | 58 | 650 | 3 | 60 | 25 |
| 9 | 60 | 650 | 3 | 60 | 25 |
| 10 | 59.5 | 600 | 3 | 60 | 25 |
| 11 | 60.5 | 600 | 3 | 60 | 25 |
| 12 | 60.5 | 600 | 3 | 60 | 25 |
| 13 | 61 | 600 | 3 | 60 | 25 |
| 14 | 61 | 650 | 3 | 60 | 25 |
| 15 | 61 | 650 | 3 | 60 | 25 |

Holes 1, 4 and 5 each were charged with 300 lbs. ANFO, 25 lbs. of a slurry of 10 percent formamide, 12 percent water, 10 percent sodium nitrate, 30 percent aluminum of 40–100 Tyler Mesh, 1 percent natural gum and the remainder ammonium nitrate, and a 1 lb. pentolite booster. Ten feet of stemming were placed on this portion of the explosive. The second deck contained 200 lbs.

of ANFO, 25 lbs. of the metallized ammonium nitrate slurry described above and 2 lbs. of pentolite. Ten feet of stemming were placed over this deck. The top deck contained 130 lbs. of ANFO and a 1 lb. pentolite booster. Twenty-three feet of stemming were placed on this deck.

The charge in holes 2 and 3 differed only in that the top deck contained only 100 lbs. of ANFO.

The charge in holes 6, 10, 11, 12 and 13 consisted of 350 lbs. of ANFO, 25 pounds of the aluminized ammonium nitrate slurry described above and a 1 lb. pentolite booster. Fifteen feet of stemming were placed over this deck. The second deck contained 150 lbs. ANFO and a 1 lb. pentolite booster. This was covered with eight feet of stemming. The top deck contained 100 lbs. ANFO and a 1 lb. pentolite booster.

The charges in holes 7, 8, 9, 14 and 15 differed from those immediately above only in that the second deck contained 200 lbs. ANFO and seven feet of stemming between the second and top decks.

Each hole was armed with an Engineers Blasting Cap connected to a 1 lb. pentolite booster by Primacord. Detonation was effected serially through remote control electrical means.

Holes 1–5 were shot first. This filled the pit and there was some indication that it was too powerful for the conditions at this mine.

The remaining holes were blasted in the following order:

| Blast No: | Holes blasted |
|---|---|
| 2 | 6 |
| 3 | 7, 8 |
| 4 | 9, 10 |
| 5 | 11 |
| 6 | 12 |
| 7 | 13 |
| 8 | 14, 15 |

The calculated powder factor was 2.86 cu. yds. per lb. of explosive.

The overburden was well broken from the coal vein and was fractured to a size readily movable by mechanical equipment at the mine.

The normal spacing using ANFO and a booster only at this mine is 22.5 x 26 ft.

Example 4

For purposes of brevity, only the charge spacing in a single hole is described in this multi-deck example. The hole charged was 71 ft. deep and 15 inches in diameter. The bottom deck was loaded in the order specified with 200 lbs. ANFO, 25 lbs. of the aluminum containing slurry described in the previous example, a 1 lb. pentolite booster and an additional 300 lbs. of ANFO. Stemming was added up to the 56 ft. level. The second deck contained 200 lbs. ANFO, 25 lbs. of the aluminum containing slurry, a 1 lb. pentolite booster and an additional 200 lbs. of ANFO. Stemming filled the holes to the 44 foot level. The third deck contained 200 lbs. ANFO with a centrally placed 1 lb. pentolite booster. The hole was stemmed to the 36 ft. level. The fourth deck contained 150 lbs. of ANFO and a 1 lb. pentolite booster. Stemming was added to the 25 ft. level. The top deck contained 100 lbs. of ANFO with a centrally located 1 lb. pentolite booster. Stemming filled the rest of this hole. All pentolite boosters were connected to Primacord. Spacing of holes was 36 x 45 feet.

On detonation, the average amount of overburden removed from the coal vein was 4260 cu. ft. per hole. By comparison, the normal practice at the mine, using primed ANFO only, was to use a spacing of 27 x 30 feet which dislodged an average of about 3195 cu. yds. of overburden per hole.

In the following Examples 5–12 various compositions were employed as the inorganic oxidizing salt mass, component (1), and the over-fueled exposive mass, component (2). Various combinations of the two components were detonated. In each instance the total weight of component (1) and component (2) was from about 15 to about 22 pounds. The component (2) was usually provided in a plastic bag and placed in a two- or five-gallon water resistant paint pail, along with a one-twelfth or one-third pound high density primer. A component (1) composition was then placed over the component (2) composition so as to substantially surround it. The detonator was attached to a strand of Primacord fuse line. The pails were sealed with a lid through which the Primacord extended. Water resistance was assured by a gasket sealing assembly at the opening were the Primacord came through the lid. The two-component systems were tested in a standard underwater test. In the testing, the Primacord was connected to an intiator and firing line and the two-component system was detonated in a body of water at about half the depth of a lake (pail placed at 42.5 feet beneath the surface of the water). The resulting pressure profile from the detonation was converted into electrical impulses by a piezoelectric gauge suspended in the water at the same level a known horizontal distance from the charge. The electrical impulses were recorded and converted to the corresponding pressures and from this the peak pressure, shock energy, bubble energy and the total energy of the explosive were calculated by methods described in "Underwater Explosives," R. H. Cole, Princeton University Press (1948). In the following examples and tables, peak pressure will be designated as "PK," the shock energy as "ESN," the bubble energy as "Y," and the total energy as "ET." Also, the component (1) compositions and component (2) composition were detonated separately, usually employing an HDP or pentolite primer, to serve as controls. All percentages are percent by weight unless otherwise indicated.

Example 5

In this example component (1) consisted of an ANFO explosive which contained ammonium nitrate, about 94 percent by weight, and fuel oil, about 6 percent by weight. A component (2) over-fueled explosive was prepared which consisted of 57.6 percent ammonium nitrate, 2.4 percent fuel oil and 40 percent of a particulate metal. Various particulate metals were employed in the different shots. The metals employed consisted of particulate aluminum, having a size of from about minus 30 to about plus 90 mesh; a magnesium-aluminum alloy, designated in the following examples as Mg/Al, containing about 40 percent magnesium and 60 percent aluminum and having a particulate size range of from about minus 20 to plus 60 mesh, and a magnesium-zinc alloy having the ASTM designation ZK60. The two-components were placed together in a pail, as described hereinbefore, in various proportions of component (1) to component (2). The different combinations were detonated and the peak pressure, PK; bubble energy, Y; shock energy, ESN; and total energy ET, for each shot tabulated. To serve as a control, a quantity of component (1) was detonated alone employing a one-third pound HDP primer. Also, the different components (2) were detonated separately and the pressures and energies tabulated for controls. Certain of the controls for component (2) shot in this Example 5 are also employed for controls in some of the other examples as indicated hereinafter. The compositions, type of metal, and results are tabulated in the following Table III.

Figure 4:
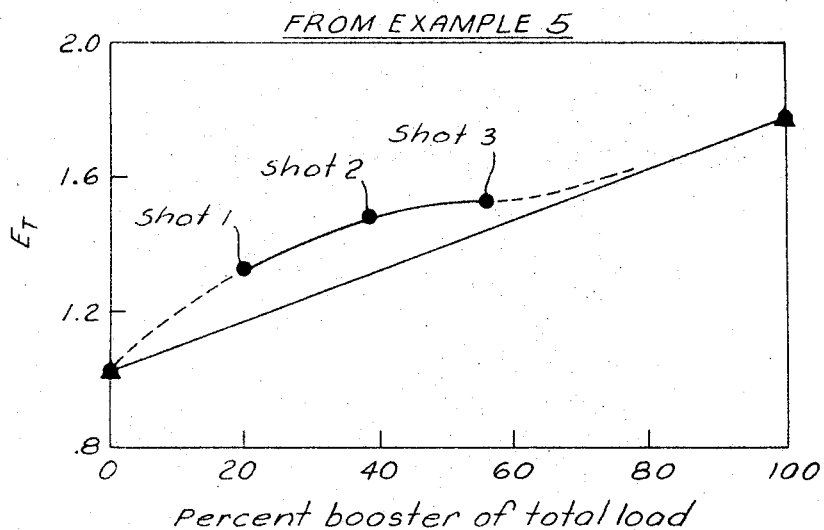
Figure 5:
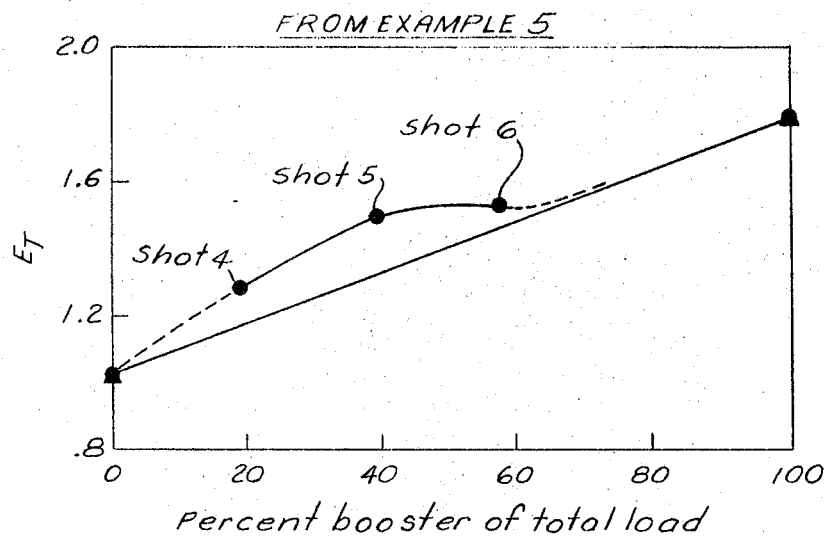
Figure 6:
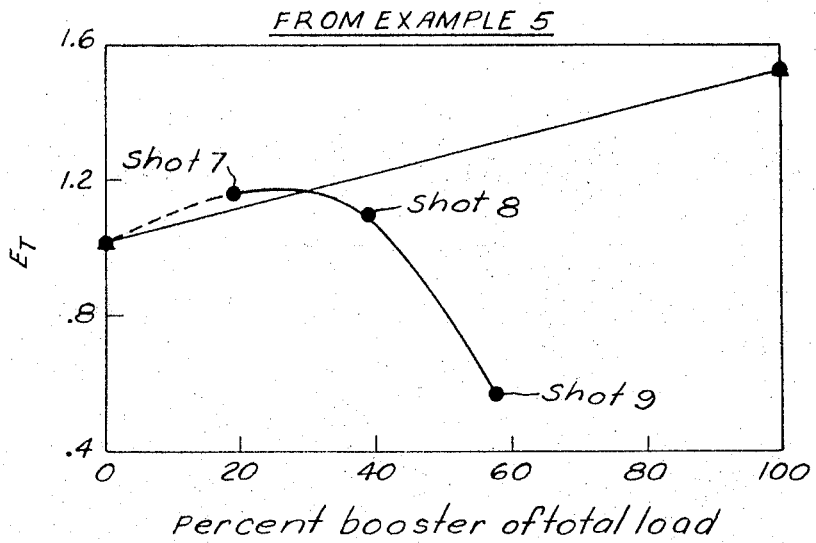
Figure 7:
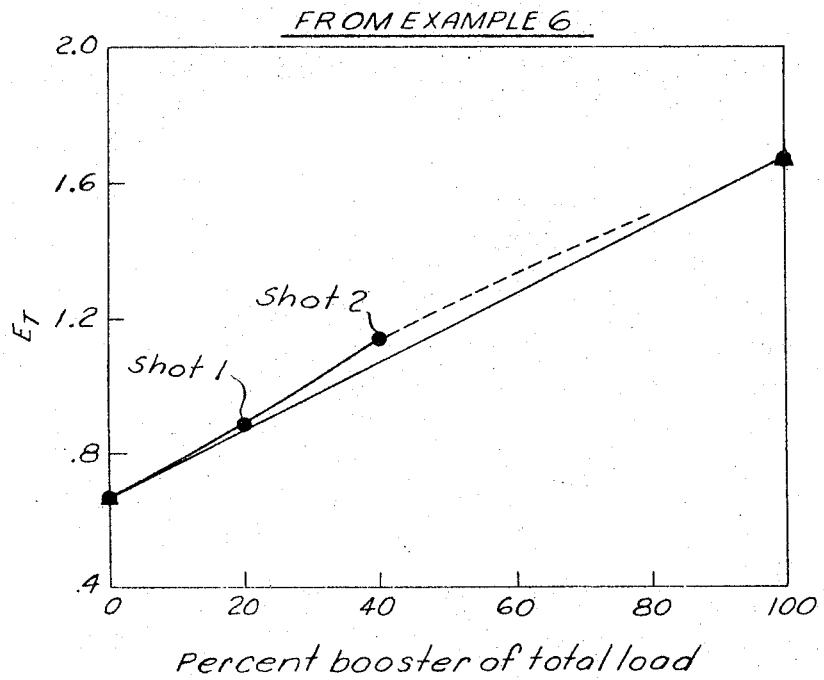

The total energies obtained upon detonation of these specific combinations of components (1) and (2) are greater than the theoretical expected value obtained by the total energy of each component when detonated separately as illustrated by FIGURES 4–6. Furthermore, it appears that particulate aluminum and particulate Mg/Al alloy show superior results over the Mg/Zn alloy composed primarily of Mg.

TABLE III

| Shot No. | Metal and percent in comp. (2) | Wt. comp. (2), lbs. | Wt. comp. (1), lbs. | Percent comp. (2) of (1) plus (2) | ESN | Y | ET | PK |
|---|---|---|---|---|---|---|---|---|
| 1 | Particulate aluminum 40 percent | 3.65 | 14.75 | 19.8 | .615 | .715 | 1.330 | 3,317 |
| 2 | do | 7.30 | 11.64 | 38.5 | .636 | .846 | 1.483 | 2,928 |
| 3 | do | 10.95 | 8.59 | 56.0 | .587 | .945 | 1.532 | 2,930 |
| 4 | Mg/Al 40 percent | 3.65 | 14.93 | 19.6 | .568 | .714 | 1.283 | 3,043 |
| 5 | do | 7.30 | 11.63 | 38.6 | .640 | .852 | 1.493 | 3,085 |
| 6 | do | 10.95 | 8.55 | 56.2 | .588 | .940 | 1.528 | 2,951 |
| 7 | Mg/Zn 40 percent | 3.65 | 14.85 | 19.73 | .489 | .682 | 1.171 | 2,428 |
| 8 | do | 7.30 | 11.65 | 38.52 | .424 | .134 | 1.101 | 2,375 |
| 9 | do | 10.95 | 8.55 | 56.15 | .677 | .431 | 1.566 | 1,603 |
| Control Comp. (1) | | | 44.81 | | .56 | .52 | 1.08 | 3,296 |
| Control Comp. (2) | Particulate aluminum 40 percent | ~20 | | | .668 | 1.109 | 1.777 | 2,884 |
| Do | Mg/Al alloy 40 percent | 20 | | | .658 | 1.130 | 1.789 | 2,920 |
| Do | Mg/Zn alloy 40 percent | ~20 | | | .480 | 1.062 | 1.542 | 2,188 | of the separate energies of each component when detonated separately, FIGURE 7. The other combinations of components (1) and (2) showed similar results as illustrated in the table.

TABLE IV

| Shot No. | Metal and % in Comp. (2) | Wt. Comp. (2) lbs. | Wt. Comp. (1) lbs. | Percent Comp. (2) of Total | ESN | Y | ET | PK |
|---|---|---|---|---|---|---|---|---|
| 1 | Mg/Al 20% | 4.00 | 16.14 | 19.86 | .337 | .496 | .873 | 2,539 |
| 2 | Mg/Al 20% | 7.79 | 11.90 | 39.56 | .527 | .640 | 1.167 | 3,110 |
| 3 | Mg/Al 40% | 4.07 | 16.16 | 20.12 | .353 | .539 | .893 | 2,286 |
| 3 | Mg/A. 40% | 8.06 | 12.15 | 39.88 | .435 | .732 | 1.167 | 2,578 |
| 5 | Aluminum 20% | 4.00 | 16.33 | 19.68 | .364 | .478 | .842 | 2,438 |
| 6 | do | 7.79 | 11.96 | 39.44 | .532 | .627 | 1.160 | 3,054 |
| 7 | Aluminum 40% | 4.00 | 16.57 | 19.44 | .191 | .367 | .558 | 1,806 |
| 8 | do | 7.81 | 12.71 | 38.06 | .284 | .546 | .830 | 1,937 |
| Controls: | | | | | | | | |
| Comp. (1) | | | ~19 | | .265 | .338 | .603 | 2,018 |
| Comp. (1) | | | 18.91 | | .337 | .385 | .722 | 2,111 |
| Comp. (2) | Mg/Al 20% | ~20 | | | .740 | 0.940 | 1.680 | 3,120 |
| (2) | Mg/Al 40% | ~20 | | | .658 | 1.130 | 1.789 | 2,920 |
| (2) | Aluminum 20% | ~20 | | | .818 | .854 | 1.673 | 3,681 |
| (2) | Aluminum 40% | ~20 | | | .668 | 1.109 | 1.777 | 2,884 |

Example 6

A component (1) slurry composition was prepared containing the following constituents:

Constituent: Percent
- Ammonium nitrate — 69
- Sodium nitrate — 8
- Water — 7
- Formamide — 10
- Propylene glycol — 1
- Sugar — 4
- Guar gum — 1

The component (2) composition consisted of the same compositions as employed in Example 5 except that magnesium-zinc alloy, ZK60, was not employed. In this instance two different percentages of metal were employed in the component (2), i.e. 20 and 40 percent by weight. Various combinations of components (1) and (2) were tested in the underwater tests as described previously. The test conditions and results are tabulated in the following Table IV. Again controls were run consisting of shooting component (1) without a component (2) and the shooting of component (2) without component (1). Again, the total energy observed on the detonation of the combination of component (1) and (2) (containing 20 percent of particulate Mg/Al) approached close to or exceeded that theoretically expected from the addition Example 7

The following Examples 7-11 illustrate the unexpected results obtained when the composition of component (1) consists of a very insensitive explosive or a composition consisting essentially of only an inorganic oxidizing salt and which would not normally be considered an explosive.

In the first test ammonium nitrate consisting of 50 percent by weight of whole prills (minus 6 to plus 16 mesh) and 50 percent of crushed prills (from about minus 16 to plus 100 mesh) was employed as component (1). Component (2) consisted of the same compositions as used in Examples 5 and 6. The test conditions and results are tabulated in the following Table V. A control for component (1) was shot and the same controls for Examples 5 and 6 are employed for component (2) having 20 and 40 percent Mg/Al and aluminum metal. Controls for 60 percent metallized component (2) were also shot. The total energies upon detonation of the two component systems again exceeded that expected as shown by the comparative results employing 20 and 40 percent metallized component (2) composition with magnesium alloy as the metal, FIGURES 8 and 9. Similar results are shown employing aluminum as the particulate fuel in component (2), Shots 7-12.

TABLE V

| Shot. No. | Metal and % in Comp. (2) | Wt. Comp. (2) lbs. | Wt. Comp. (1) lbs. | % Comp. (2) of Total | ESN | Y | ET | PK |
|---|---|---|---|---|---|---|---|---|
| 1 | Mg/Al 20% | 3.39 | 13.81 | 19.71 | .304 | .424 | .729 | 2,322 |
| 2 | Mg/Al 20% | 6.87 | 10.40 | 39.78 | .471 | .580 | 1.052 | 2,684 |
| 3 | Mg/Al 40% | 3.46 | 13.67 | 20.20 | .229 | .478 | .707 | 2,069 |
| 4 | Mg/Al 40% | 7.15 | 9.95 | 41.81 | .401 | .703 | 1.104 | 2,261 |
| 5 | Mg/Al 60% | 3.47 | 13.89 | 19.99 | .105 | .346 | .451 | 1,467 |
| 6 | Mg/Al 60% | 7.20 | 10.73 | 40.16 | .166 | .594 | .761 | 1,541 |
| 7 | Aluminum 20% | 3.39 | 13.44 | 20.14 | Misfired | | | |
| 8 | do | 6.87 | 10.32 | 39.96 | .451 | .588 | 1.039 | 2,483 |
| 9 | Aluminum 40% | 3.39 | 14.06 | 19.43 | .254 | .426 | .680 | 2,073 |
| 10 | do | 6.90 | 10.59 | 39.45 | .375 | .642 | 1.018 | 2,232 |
| 11 | Aluminum 60% | 3.43 | 13.66 | 20.07 | Misfired | | | |
| 12 | do | 7.06 | 10.53 | 40.14 | .017 | .097 | .114 | 1,244 |
| Control, Comp. (1) | | | 43.9 | | .021 | .064 | .085 | 1,273 |
| Control | | | | | .284 | 1.052 | 1.446 | 1,905 |
| Comp. (2) | Mg/Al 60% | | | | .210 | .920 | 1.131 | 1.766 |
| Comp. (2) | Al 60% | | | | | | | |

Example 8

Figure 10:
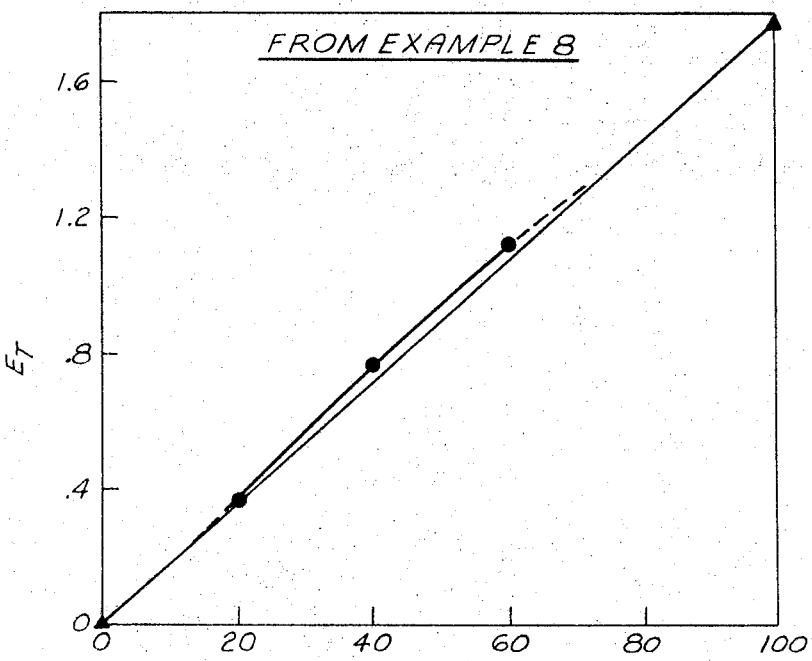

A composition containing about 80 percent particulate ammonium nitrate and 20 percent by weight of water was employed as component (1). It was detonated with an over-fueled explosive composition, component (2), corresponding to that employed in Examples 5-7, in the manner as indicated in the previous examples. The compositions and underwater test results are tabulated in following Table VI. A control for component (1) was shot as in the previous examples. The controls for component (2) are the same as in Examples 5 and 6. FIGURE 10 illustrates the favorable results obtained when employing 40 percent aluminum in component (2). Similar results were obtained when employing Mg/Al as is shown in the Table VI, Shots 4-9.

TABLE VI

| Shot. No. | Metal and % in Comp. (2) | Wt. Comp. (2) lbs. | Wt. Comp. (1) lbs. | % Comp. (2) of Total | ESN | Y | ET | PK |
| --- | --- | --- | --- | --- | --- | --- | --- | --- |
| 1 | Aluminum 40% | 4.74 | 18.31 | 20.6 | .122 | .242 | .365 | 1,633 |
| 2 | do | 8.91 | 13.00 | 40.5 | .293 | .478 | .772 | 2,287 |
| 3 | do | 12.54 | 8.33 | 60.1 | .421 | .691 | 1.112 | 2,355 |
| 4 | Mg/Al 40% | 4.80 | 18.30 | 20.8 | .133 | .248 | .381 | 1,853 |
| 5 | do | 9.16 | 13.02 | 41.3 | .289 | .491 | .781 | 2,259 |
| 6 | do | 13.11 | 8.68 | 60.2 | .405 | .673 | 1.078 | 2,504 |
| 7 | Mg/Zn 40% | 4.77 | 18.43 | 20.6 | .061 | .074 | .087 | 1,279 |
| 8 | do | 9.05 | 12.96 | 41.1 | .195 | .253 | .321 | 1,320 |
| 9 | do | 12.85 | 7.76 | 62.3 | .257 | .328 | .409 | 1,355 |
| Control, Comp. (1) | | | 22.56 | | .010 | .007 | .018 | 1,254 |

Example 9

Figure 11:
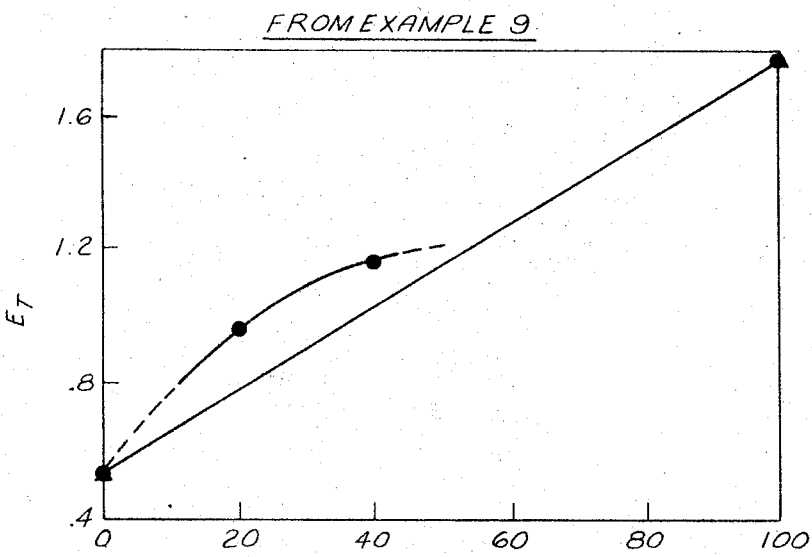

In this example, component (1) consisted of 90 percent by weight of ammonium nitrate and 10 percent by weight of Diver's fluid (anhydrous liquid ammonia saturated with ammonium nitrate). The composition of component (2) was the same as employed in Example 5. The metal employed, compositions and underwater test results are tabulated in following Table VII. Two control shots of component (1) alone were made employing a one-third pound HDP primer. The controls for component (2) are the same as in Examples 5 and 6. FIGURE 11 illustrates the favorable results obtained when employing a 40 percent Mg/Al metallized component (2). Similar results were obtained when employing a 20 percent Mg/Al metallized component (2) as is demonstrated in Table VII, Shots 1-4.

TABLE VII

| Shot. No. | Metal and % in Comp. (2) | Wt. Comp. (2) lbs. | Wt. Comp. (1) lbs. | Percent Comp. (2) of Total | ESN | Y | ET | PK |
| --- | --- | --- | --- | --- | --- | --- | --- | --- |
| 1 | Mg/Al 20% | 8.41 | 30.20 | 21.78 | .337 | .490 | .827 | 2,564 |
| 2 | Mg/Al 20% | 16.61 | 22.20 | 45.12 | .471 | .614 | 1.085 | 2,880 |
| 3 | Mg/Al 20% | 3.33 | 12.87 | 20.55 | .365 | .482 | .848 | 2,418 |
| 4 | Mg/Al 20% | 6.65 | 10.14 | 39.60 | .455 | .623 | 1.078 | 2,605 |
| 5 | Mg/Al 40% | 8.38 | 31.37 | 21.08 | Misfired | | | |
| 6 | Mg/Al 40% | 16.13 | 23.16 | 41.05 | .438 | .730 | 1.169 | 2,620 |
| 7 | Mg/Al 40% | 3.32 | 12.56 | 20.90 | .385 | .576 | .961 | 2,197 |
| 8 | Mg/Al 40% | 6.64 | 10.33 | 39.12 | .443 | .724 | 1.168 | 2,368 |
| Control: Comp. (1) | | | 37.70 | | .246 | .327 | .573 | 2,138 |
| Comp. (1) | | | 16.19 | | .219 | .319 | .537 | 2,113 |

Example 10

Figure 12:
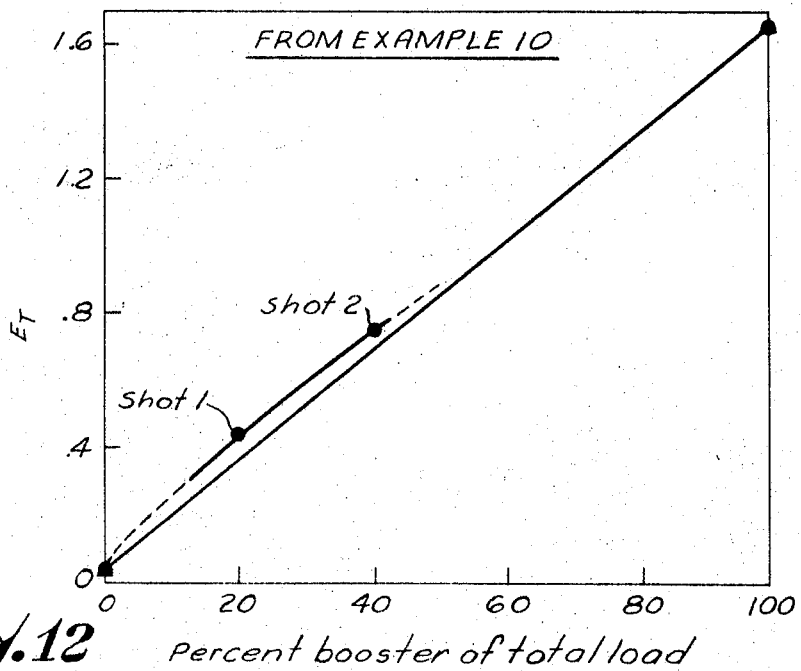
Figure 13:
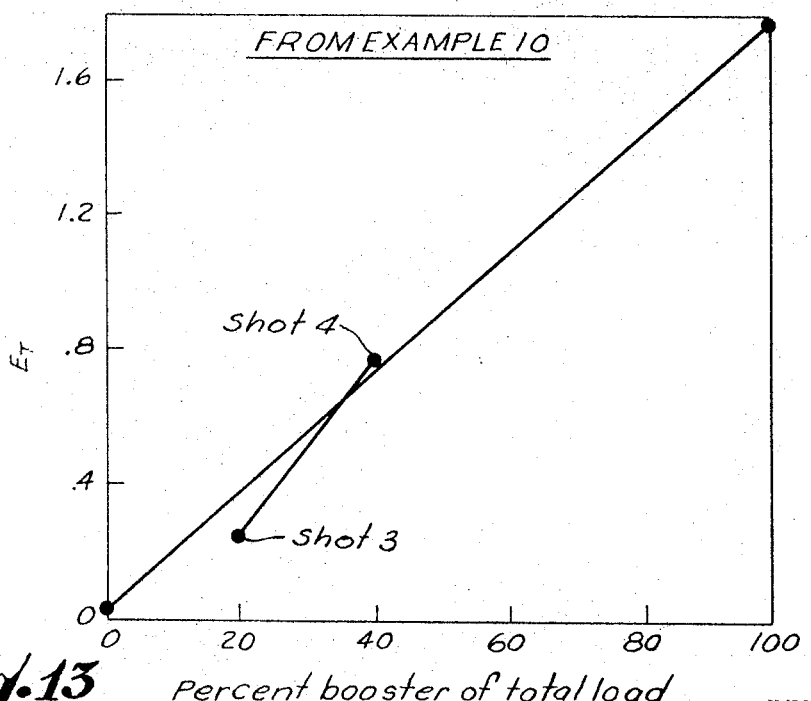

In this example underwater tests were conducted employing a component (1) composition containing (parts by weight):

| | |
| --- | --- |
| Ammonium nitrate | 85 |
| Water | 15 |
| Ethylene glycol | 13.15 |
| Guar gum | 2 | and a component (2) composition substantially the same as that employed in Example 5. The compositions and underwater tests results are tabulated in the following Table VIII, including a control shot for component (1). The controls for component (2) are again the same as presented in Examples 5 and 6. FIGURES 12 and 13 illustrate the results obtained when employing 20 and 40 percent Mg/Al metallized component (2).

TABLE VIII

| Shot. No. | Metal and % in Comp. (2) | Wt. Comp. (2) lbs. | Wt. Comp. (1) lbs. | Percent Comp. (2) of Total | ESN | Y | ET | PK |
| --- | --- | --- | --- | --- | --- | --- | --- | --- |
| 1 | Mg/Al 20% | 4.00 | 16.70 | 19.32 | .182 | .252 | .435 | 2,132 |
| 2 | Mg/Al 20% | 8.00 | 12.24 | 39.53 | .341 | .410 | .752 | 2,506 |
| 3 | Mg/Al 40% | 4.00 | 17.28 | 18.80 | .089 | .142 | .232 | 1,477 |
| 4 | Mg/Al 40% | 8.00 | 12.43 | 39.16 | .300 | .483 | .783 | 2,297 |
| Control Comp. (1) | | | 23.09 | | .010 | .011 | .021 | 1,380 |

Example 11

Another underwater test was conducted employing a component (1) composition containing (parts by weight):

| | |
| --- | --- |
| Ammonium nitrate | 85 |
| Water | 15 |
| Ethylene glycol | 13.15 |
| Liquid ammonia | 10.2 |
| Guar gum | 2 |

Figure 14:
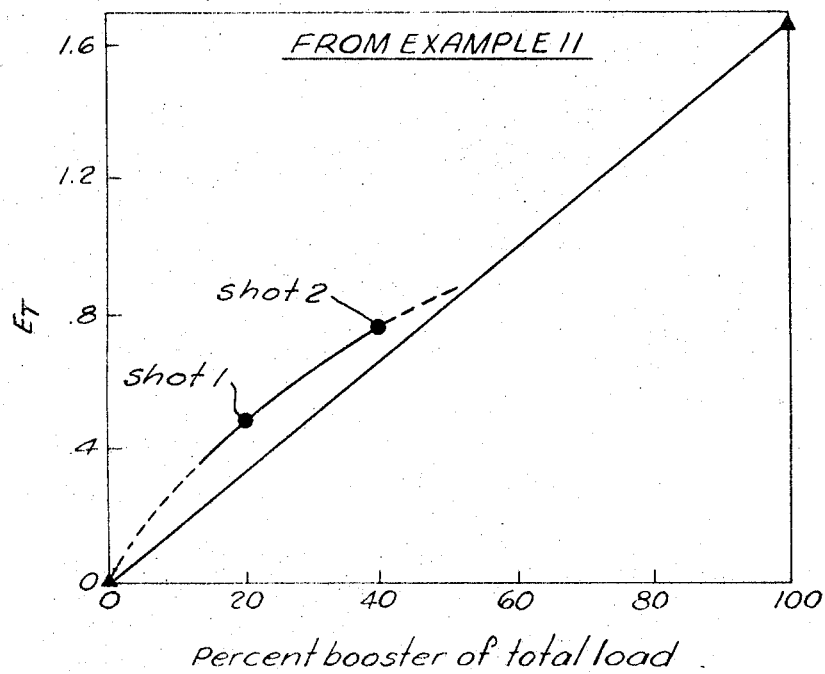

Component (2) and the controls for component (2) are the same as employed in Example 5. The composition and underwater test results for the shots and the control shot for component (1) are tabulated in the following Table IX. FIGURE 14 graphically illustrates the results obtained employing a 20 percent Mg/Al metallized component (2).

TABLE IX

| Shot. No. | Metal and % in Comp. (2) | Wt. Comp. (2) lbs. | Wt. Comp. (1) lbs. | Percent Comp. (2) of Total | ESN | Y | ET | PK |
| --- | --- | --- | --- | --- | --- | --- | --- | --- |
| 1 | Mg/Al 20% | 4.00 | 16.20 | 19.80 | .208 | .290 | .498 | 2,121 |
| 2 | Mg/Al 20% | 8.00 | 11.81 | 40.38 | .326 | .430 | .757 | 2,360 |
| 3 | Mg/Al 40% | 4.00 | 16.68 | 19.34 | .176 | .311 | .488 | 1,893 |
| 4 | Mg/Al 40% | 8.00 | 12.02 | 39.96 | .306 | .519 | .826 | 2,203 |
| Control, Comp. (1) | | | 22.10 | | .015 | .000 | .015 | 1,367 |

Example 12

An underwater test was conducted employing a component (1) slurry composition containing the following constituents.

| Constituent: | Percent |
|---|---|
| Ammonium nitrate | 69 |
| Sodium nitrate | 8 |
| Water | 7 |
| Formamide | 10 |
| Propylene glycol | 1 |
| Sugar | 4 |
| Guar Gum | 1 |

Component (2) consisted of a second slurry composition containing as a basic composition, as parts by weight:

| | |
|---|---|
| Ammonium nitrate | 38 |
| Sodium nitrate | 10 |
| Water | 13 |
| Formamide | 8 |
| Propylene glycol | 1.2 |
| Guar gum | 1.0 |
| Aluminum metal | 30.0 | tional booster and component (2) were employed. Component (2) consisted of the same composition as employed in Example 5 and contained 40 percent of a particulate metal. Two base compositions were employed. The first being essentially the same as that employed in Example 11 (noted in Table XI as Comp. 1) and the second consisted of ANFO (94 percent ammonium nitrate and 6 percent fuel oil noted in Table XI as ANFO). The specific boosters, amount of booster and compositions employed together with the results of underwater tests are tabulated in the following Table XI.

Shots 1–4 and 8–11 illustrate the decreased total energy obtained when employing greater amounts of a conventional high pressure booster to detonate the base composition, component (1), while shots 5–7 and 12–15 illustrate the increase in total energy obtained by employing component (2) as the booster.

FIGURES 15 and 16 show this increased total energy obtained while employing greater amounts of the over-fueled component (2) in comparison with the decreased total energies obtained when employing a greater amount of a conventional high pressure booster.

TABLE XI

| Shot No. | Comp. of component (1) | Component (2) | Wt. comp. (2), lbs. | Wt. comp. (1), lbs. | Percent comp. (2) of total | ESN | Y | ET | PK |
|---|---|---|---|---|---|---|---|---|---|
| 1 | Comp. (1) | Pentolite | | | 11.11 | .317 | .379 | .697 | 2,290 |
| 2 | Comp. (1) | do | | | 21.35 | .335 | .382 | .738 | 2,537 |
| 3 | Comp. (1) | do | | | 30.79 | .355 | .375 | .731 | 2,736 |
| 4 | Comp. (1) | do | | | 39.95 | .347 | .363 | .710 | 2,742 |
| 5 | Comp. (1) | 40% Mg/Al in ANFO | 4.00 | 16.68 | 19.34 | .176 | .311 | .488 | 1,893 |
| 6 | Comp. (1) | do | 8.00 | 11.81 | 40.38 | .306 | .519 | .826 | 2,230 |
| 7 | Comp. (1) | do | ⅓ | 38.96 | .84 | .56 | .52 | 1.08 | 3,296 |
| 8 | ANFO | HDP | 5 | 39.88 | 11.14 | .52 | .49 | 1.01 | 3,076 |
| 9 | ANFO | HDP | 10 | 36.88 | 21.33 | .50 | .47 | .97 | 3,003 |
| 10 | ANFO | HDP | 15 | 31.14 | 32.51 | .53 | .47 | .99 | 3,222 |
| 11 | ANFO | HDP | 20 | 28.9 | 40.9 | .48 | .45 | .93 | 3,028 |
| 12 | ANFO | HDP | | | | | | | |
| 13 | ANFO | 40% Aluminum in ANFO | 3.65 | 14.75 | 19.8 | .615 | .715 | 1.330 | 3,317 |
| 14 | ANFO | do | 7.30 | 11.64 | 38.5 | .636 | .846 | 1.483 | 2,928 |
| 15 | ANFO | do | 10.95 | 8.59 | 56.0 | .587 | .945 | 1.532 | 2,930 |

The particulate aluminum metal ranged in size from about minus 20 mesh to plus 100 mesh. The component (1) composition was detonated employing only a ⅓ pound HDP primer and only with a pentolite booster to serve as controls. Various proportions of component (1) to component (2) were detonated together employing a ⅓ pound HDP primer as an initiator. The various portions of component (1) to component (2) and the results of the underwater tests are set forth in the following Table X.

Example 14

An underwater test was conducted employing as a component (1) composition an aqueous solution of 60 percent sodium perchlorate. The solution was detonated with a one-third pound HDP primer to serve as a control. A component (1) solution was then detonated employing as a first component (2) over-fueled composition a dry composition containing the following constituents as percent by weight.

| | |
|---|---|
| Particulate aluminum | 40 |
| Ammonium nitrate | 57.6 |
| Fuel oil | 2.4 |

TABLE X

| Shot No. | Type of booster | Wt. and/or percent by weight of booster | Percent Aluminum metal total comp. (1) and comp. (2) | ESN | Y | ET | PK |
|---|---|---|---|---|---|---|---|
| Control | HDP | ⅓ pound | | 0.41 | 0.41 | 0.82 | 2,877.2 |
| Do | Pentolite | 38.39% | | 0.38 | 0.39 | 0.17 | 2,929.86 |
| 1 | Comp. (2) | 13.25% | 3.98 | 0.46 | 0.46 | 0.92 | 2,082.0 |
| 2 | Comp. (2) | 26.33% | 7.90 | 0.45 | 0.49 | 0.94 | 2,856.27 |
| 3 | Comp. (2) | 40.14% | 12.04 | 0.53 | 0.57 | 1.10 | 3,141.75 |
| 4 | Comp. (2) | 53.23% | 15.97 | 0.54 | 0.61 | 1.15 | 3,216.81 |

Example 13

In this example separate samples of a base composition as a component (1), the inorganic oxidizing salt mass, were detonated with both a conventional high pressure booster and a specific over-fueled composition, noted herein as component (2). Different amounts of the conven- Another portion of a component (1) solution was detonated with a second component (2) composition containing the same constituents, as parts by weight, as the component (2) employed in Example 12. A two-gallon pail was employed for the test and the two-component system consisted of 60 percent by weight of component (1) and 40 percent by weight of component (2).

The results of the underwater tests are set forth in the following Table XII.

TABLE XII

| Shot No. | Component (2) | ESN | Y | ET | PK |
|---|---|---|---|---|---|
| Control | HDP Primer | | | | |
| 1 | First component (2) | 0.24 | 0.40 | 0.64 | 1,784 |
| 2 | Second component (2) | 0.27 | 0.36 | 0.63 | 2,248 |

Example 15

In this example underwater tests were made on a component (1) composition consisting of sodium perchlorate prills. The component (1) composition was detonated employing the same first and second component (2) compositions as employed in Example 14. The results are tabulated in the following Table XIII.

TABLE XIII

| Shot No. | Component (2) | ESN | Y | ET | PK |
|---|---|---|---|---|---|
| Control | HDP Primer | | | | |
| 1 | First component (2) | 0.22 | 0.46 | 0.68 | 1,747 |
| 2 | Second component (2) | 0.23 | 0.37 | 0.60 | 2,090 |

The explosives and the method of their preparation and loading into boreholes can be used in any type of blasting operation, including metal ore mining, limestone quarrying, sand pits, excavation operations for construction of buildings or dams, building stone quarrying, surface pond formations and for underground mining.

The use of other over-fueled components, defined as component (2) above, can be used to replace the aluminum, sodium nitrate and ammonium nitrate slurries and the ammonium nitrate fuel oil and particulate metal dry compositions of these examples. The results obtained from the various specific compositions of component (2) will depend largely on the amount of energy released and the rate of its release in the oxidation of the oxidizable material of component (2) by the oxidizing agent of component (1).

Also, other oxidizing ingredients defined under (1) above can be used in place of the mixtures defined in the examples.

As is evident from the description of the invention, the method of preparing the two-component explosive composition comprises placing the inorganic oxidizing ingredient mass defined as component (1), contiguous to an over-fueled inorganic oxidizing salt mass, defined as component (2) above. The proportions of component (1) to component (2) can vary over a wide range, and should contain a sufficient amount of component (2) so as to provide at least .75 percent by weight of fuel, usually as carbon, or any of the metals or alloys mentioned above and not more fuel than is sufficient to provide a stoichiometric quantity thereof as calculated from the total amount of oxidizing agents available in components (1) and (2). Therefore upon the explosion of component (2) a certain amount of the fuel will be oxidized during the detonation reaction. That fuel which is not completely oxidized to its highest oxidation state will be available for oxidation by the other oxidizing material present, namely the inorganic oxidizing salts of component (1).

The method of loading boreholes comprises placing the oxidizing mass defined as component (1) contiguous to the over-fueled mixture defined as component (2) in one or more decks in the boreholes and arming the explosive with one or more high pressure boosters. For most favorable results, the over-fueled portion of the explosive system, component (2), should be near the bottom of the borehole, or near the area requiring the greatest power for dislodging rock or ore from a face. The ratio of component (1) to component (2) in any one deck or in any borehole can range from about 2 to 1 to about 20:1, depending in part on the fuel in component (2) and in part on the type of structures being blasted.

Various modifications may be made in the present invention without departing from the spirit or scope thereof for it is understood that we are limited only as defined in the appended claims.

What is claimed is:

1. An explosive composition which comprises: a component (1), comprising an inorganic oxidizing salt mass, contiguous to a component (2), an explosive composition mass comprising at least one inorganic oxidizing salt and from about 18 to about 80 percent by weight of a particulate metal, wherein the weight ratio of component (1) to component (2) ranges from about 2:1 to about 20:1 and wherein there is a sufficient quantity of component (2) to provide at least about .75 percent by weight of incompletely oxidized metal, based on the total weight of component (1) and component (2), and further wherein there is at least a sufficient amount of available inorganic oxidizing salts in component (1) and component (2) to oxidize the incompletely oxidized metal to its highest oxidation state.

2. The explosive as defined in claim 1 wherein component (2) contains from 18 to 80 percent of particulate aluminum.

3. The explosive as defined in claim 1 wherein component (2) contains from 25 to about 70 percent of a metal selected from the group consisting of magnesium, aluminum or mixtures thereof.

4. The explosive as defined in claim 1 wherein component (1) comprises at least one inorganic oxidizing salt and a petrolic liquid.

5. The explosive as defined in claim 1 wherein component (2) comprises from about 30 to about 80 percent of ammonium nitrate, from about 1 to about 10 percent of a petrolic liquid and from about 18 to about 60 percent of a particulate metal.

6. An explosive which comprises: a component (1), comprising an inorganic oxidizing salt mass contiguous to a component (2), an overfueled explosive composition mass comprising an inorganic oxidizing salt and a particulate inorganic fuel, said fuel being present in component (2) in an amount in excess of that stoichiometrically required for substantially complete oxidation to its highest oxidation state by said salt of said component (2) upon explosion, and said component (2) being provided in an amount to provide said excess inorganic fuel in an amount from about 0.75 weight percent, based on the total weight of components (1) and (2), to about the stoichiometric quantity of inorganic fuel required for substantially complete oxidation to its highest oxidation state based on the total available amount of inorganic oxidizing salts in component (1) and component (2).

7. The explosive as defined in claim 6 wherein the inorganic fuel in said component (2) comprises particulate metal.

8. The explosive as defined in claim 7 wherein component (2) contains from about 18 to about 80 percent by weight of the particulate metal.

9. The explosive as defined in claim 6 wherein component (2) contains from 25 to about 70 percent of a particulate metal.

10. The explosive as defined in claim 6 wherein the inorganic fuel in said component (2) comprises particulate carbon.

11. The exposive as defined in claim 6 wherein component (2) is surrounded by a substantial quantity of component (1).

12. The explosive as defined in claim 6 wherein component (1) comprises from about 90 to 100 percent of an inorganic oxidizing salt and up to about 10 percent of petrolic liquid.

13. The explosive as defined in claim 12 wherein the fuel in said component (2) comprises particulate metal.

14. The explosive system as defined in claim 6 wherein said inorganic fuel in component (2) comprises particulate aluminum.

15. The explosive as defined in claim 6 wherein said inorganic fuel comprises particulate magnesium-aluminum alloy.

16. The explosive as defined in claim 6 wherein said inorganic fuel comprises particulate magnesium.

17. The explosive as defined in claim 6 wherein component (1) comprises an inorganic oxidizing salt and a solvent for said salt.

18. The explosive as defined in claim 17 wherein the fuel consists of particulate metal.

19. The explosive as defined in claim 17 wherein component (2) contains from about 25 to about 70 percent of particulate metal.

20. The explosive as defined in claim 17 wherein the solvent comprises water.

21. The explosive as defined in claim 17 wherein component (1) includes in addition up to about 5 percent of a thickening agent.

22. The explosive as defined in claim 17 wherein the solvent in component (1) comprises anhydrous liquid ammonia.

23. The explosive as defined in claim 17 wherein the solvent in component (1) comprises an organic liquid solvent.

24. The explosive as defined in claim 6 wherein component (2) comprises from about 30 to about 80 percent of ammonium nitrate, from about 1 to about 10 percent petrolic liquid, and from about 18 to about 60 percent of particulate metal.

25. The explosive as defined in claim 6 wherein the weight ratio of component (1) to component (2) ranges from about 2:1 to about 20:1.

References Cited

UNITED STATES PATENTS

| | | | |
|---|---|---|---|
| 3,288,658 | 11/1966 | Ferguson et al. | 149—2 X |
| 3,288,661 | 11/1966 | Swisstack | 149—60 X |
| 3,326,734 | 6/1967 | Slykhouse | 149—2 X |
| 3,346,429 | 10/1967 | McMahon et al. | 149—2 |
| 3,377,909 | 4/1968 | Grant et al. | 102—23 X |
| 3,378,415 | 4/1968 | Griffith | 149—2 |
| 3,388,014 | 6/1968 | Russo | 149—2 X |
| 3,400,026 | 9/1968 | Fearnow | 149—2 X |

BENJAMIN R. PADGETT, Primary Examiner

S. J. LECHERT, Assistant Examiner

U.S. Cl. X.R.

102—99; 149—15, 37, 43, 44